United States Patent
Lee

(10) Patent No.: US 8,031,275 B2
(45) Date of Patent: Oct. 4, 2011

(54) UPPER SUBSTRATE FOR TOUCH SCREEN PANEL, METHOD OF MANUFACTURING THE SAME AND DISPLAY DEVICE HAVING THE SAME

(75) Inventor: Byoung-Jun Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 569 days.

(21) Appl. No.: 12/196,318

(22) Filed: Aug. 22, 2008

(65) Prior Publication Data

US 2009/0174832 A1    Jul. 9, 2009

(30) Foreign Application Priority Data

Jan. 7, 2008    (KR) .......................... 10-2008-001618

(51) Int. Cl.
*G02F 1/1335*    (2006.01)
*G09G 3/36*    (2006.01)
*G06F 3/041*    (2006.01)

(52) U.S. Cl. ........ 349/12; 345/173; 345/104; 178/18.01

(58) Field of Classification Search .................... 349/12; 345/103–104, 173, 174, 176, 177, 178; 178/18.01
See application file for complete search history.

(56) References Cited

U.S. PATENT DOCUMENTS

| 6,501,529 B1* | 12/2002 | Kurihara et al. | ............... 349/160 |
| 7,675,580 B2* | 3/2010 | Rho | ................................ 349/12 |
| 2009/0107736 A1* | 4/2009 | Ben-Eliyahu et al. | ..... 178/18.01 |
| 2010/0053112 A1* | 3/2010 | Chen | ............................ 345/174 |

FOREIGN PATENT DOCUMENTS

| JP | 2004-302546 | 10/2004 |
| KR | 1020030054818 A | 7/2003 |
| KR | 1020030055924 A | 7/2003 |

* cited by examiner

*Primary Examiner* — Hoan Nguyen
(74) *Attorney, Agent, or Firm* — Cantor Colburn LLP

(57) ABSTRACT

An upper substrate for a touch screen panel includes an upper base substrate, a plurality of conductive spacers disposed on the upper base substrate, a height of the conductive spacers substantially adjacent to a center of the upper base substrate being smaller than a height of the conductive spacers substantially adjacent to a periphery of the upper base substrate, a common electrode disposed on the upper base substrate, and a plurality of supporting spacers disposed between the conductive spacers on the common electrode, the supporting spacers having a height greater than the height of the conductive spacers.

19 Claims, 14 Drawing Sheets

UPPER SUBSTRATE FOR TOUCH SCREEN PANEL, METHOD OF MANUFACTURING THE SAME AND DISPLAY DEVICE HAVING THE SAME

This application claims priority to Korean Patent Application No. 2008-1618, filed on Jan. 7, 2008, and all the benefits accruing therefrom under 35 U.S.C. §119, the contents of which in its entirety are herein incorporated by reference.

BACKGROUND OF THE INVENTION

1. Field of the Invention

The present invention relates to an upper substrate of a display device, a method of manufacturing the upper substrate and a display device having the upper substrate. More particularly, the present invention relates to an upper substrate for a touch screen panel, a method of manufacturing the upper substrate and a display device having the touch screen panel.

2. Description of the Related Art

Generally, a flat panel display device has various desirable characteristics such as thin thickness, light weight, low driving voltage, low power consumption, etc., which make it especially suitable for use in various fields.

Currently, the flat panel display device may include a touch screen panel to display an image and to receive information from a user. In order to input the information into the flat panel display device, pressure is applied onto the touch screen panel by a finger, a pen, etc., and a location where the pressure is applied is detected. The touch screen panel includes two substrates and a plurality of sensors interposed between the substrates in order to detect the location where pressure is applied.

However, when the thickness of the flat panel display device is decreased, the flat panel display device may be easily bent by the pressure applied to the touch screen panel. Also, when the screen size of the flat panel display device is increased, a central portion of the flat panel display device may be bent toward a lower direction by sagging due to a gravitational force. When the bending is increased, malfunction of the sensors may be increased.

BRIEF SUMMARY OF THE INVENTION

The present invention provides an upper substrate for a touch screen panel, a method of manufacturing the above-mentioned upper substrate and a display device having the above-mentioned touch screen panel.

An exemplary embodiment of an upper substrate for a touch screen panel in accordance with the present invention includes; an upper base substrate, a plurality of conductive spacers disposed on the upper base substrate, and a height of the conductive spacers substantially adjacent to a center of the upper base substrate being smaller than a height of the conductive spacers substantially adjacent to a periphery of the upper base substrate, a common electrode disposed on the upper base substrate, and a plurality of supporting spacers disposed between the conductive spacers on the common electrode, and have a height greater than the height of the conductive spacers.

Another exemplary embodiment of an upper substrate for a touch screen panel in accordance with the present invention includes; an upper base substrate, a plurality of conductive spacers which protrude from the upper base substrate, a common electrode disposed on the upper base substrate, and a plurality of supporting spacers disposed between the conductive spacers on the common electrode, and have a greater height than the conductive spacers, a distance between adjacent conductive spacers substantially adjacent to a center of the upper base substrate being smaller than a distance between adjacent conductive spacers substantially adjacent to a periphery of the upper base substrate.

An exemplary embodiment of a method of manufacturing an upper substrate for a touch screen panel in accordance with the present invention includes; disposing a plurality of protrusions on an upper base substrate, a height of the protrusions substantially adjacent to a center of the upper base substrate being smaller than a height of the protrusions substantially adjacent to a periphery of the upper base substrate, depositing a transparent conductive material on the upper base substrate having the protrusions to form a common electrode covering the upper base substrate and a conductive layer covering the protrusions, and disposing a plurality of supporting spacers between the conductive spacers on the common electrode, the supporting spacers having a greater height than the conductive spacers.

Another exemplary embodiment of a display device in accordance with the present invention includes; an upper substrate including; an upper base substrate, a plurality of conductive spacers disposed on the upper base substrate, a height of the conductive spacers substantially adjacent to a center of the upper base substrate being smaller than a height of the conductive spacers substantially adjacent to a periphery of the upper base substrate, a common electrode disposed on the upper base substrate, and a plurality of supporting spacers disposed between the conductive spacers on the common electrode, the supporting spacers having a greater height than the conductive spacers, a lower substrate facing the upper substrate, the lower substrate including; a lower base substrate, a plurality of pixel electrodes disposed on the lower base substrate substantially opposite to the common electrode, and a plurality of TFTs disposed on the lower base substrate, the TFTs being electrically connected to the pixel electrodes, and a liquid crystal layer interposed between the upper substrate and the lower substrate.

According to an upper substrate, a method of manufacturing the upper substrate and a display device having the upper substrate of the present invention, the difference between the bending amounts of the upper and lower substrates is compensated, to improve uniformity of touching sensitivity, and to decrease malfunction of sensors that sense an externally provided pressure.

BRIEF DESCRIPTION OF THE DRAWINGS

The above and other features and advantages of the present invention will become more apparent by describing in detail example embodiments thereof with reference to the accompanying drawings, in which.

DETAILED DESCRIPTION OF THE INVENTION

Figure 1:
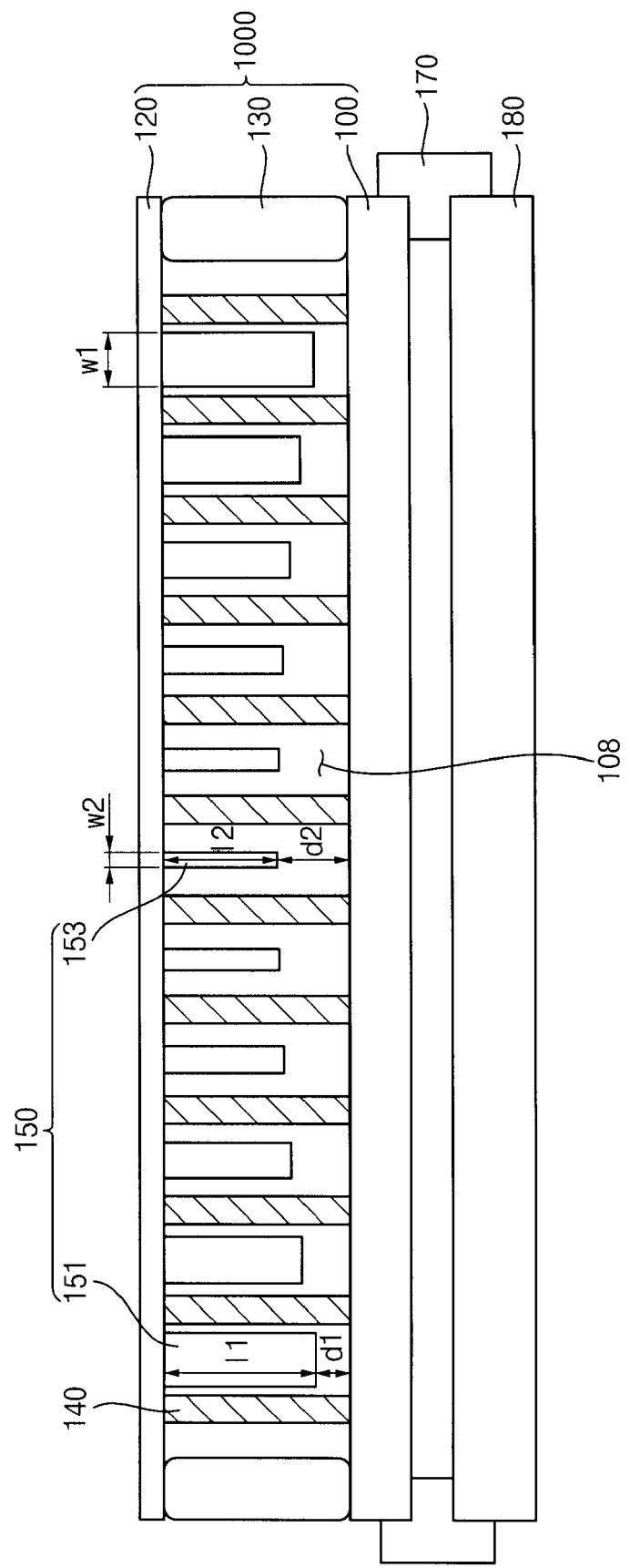
FIG. 1 is a cross-sectional view illustrating an exemplary embodiment of a display device in accordance with the present invention before the display device sags due to a gravitational force.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element or layer, it can be directly on the other element or intervening elements may be present therebetween. In contrast, when an element is referred to as being "directly on" another element, there are no intervening element present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Exemplary embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present invention will be described in detail with reference to the accompanying drawings.

FIG. 1 is a cross-sectional view illustrating an exemplary embodiment of a display device in accordance with the present invention before the display device sags due to a gravitational force.

Referring to FIG. 1, the display device includes a touch screen panel ("TSP") 1000, a receiving container 170 and a backlight assembly 180.

The backlight assembly 180 supplies the touch screen panel 1000 with light. In one exemplary embodiment, the backlight assembly 180 may include a plurality of lamps (not shown), although alternative exemplary embodiments may include various lighting components as would be known to one of ordinary skill in the art.

The receiving container 170 combines the touch screen panel 1000 with the backlight assembly 180. For example, in one exemplary embodiment, the receiving container 170 may include a mold frame, a chassis member, and various other components as would be known to one of ordinary skill in the art.

The touch screen panel 1000 displays an image using the light generated from the backlight assembly 180, and generates a position signal based on a pressure, or touch, generated by an external object. In one exemplary embodiment, the touch screen panel 1000 includes a display panel and a touch panel integrally formed with the display panel. In an alternative exemplary embodiment, the touch screen panel 1000 may have a stacked structure having the touch panel mounted on the display panel.

In the present exemplary embodiment, the touch screen panel 1000 includes a lower substrate 100, an upper substrate 120, a liquid crystal layer 108, a sealant 130, a plurality of supporting spacers 140 and a plurality of conductive spacers 150. The lower substrate 100 is combined with the upper substrate 120 through the sealant 130. Although not shown in FIG. 1, in one exemplary embodiment, the lower substrate 100 and the upper substrate 120 have substantially the same thickness.

The liquid crystal layer 108 is interposed between the lower substrate 100 and the upper substrate 120. Exemplary embodiments of the liquid crystal layer 108 may include a horizontal alignment mode liquid crystal layer, a twisted nematic (TN) mode liquid crystal layer, a super twisted nematic ("STN") mode liquid crystal layer, and various other components as would be known to one of ordinary skill in the art. In one alternative exemplary embodiment, the liquid crystal layer 108 may have a vertical alignment ("VA") mode liquid crystal layer.

The sealant 130 is disposed along sides of the lower and upper substrates 100 and 120 to seal the liquid crystal layer 108 between the lower and upper substrates 100 and 120. In one exemplary embodiment, the thickness of the TSP 1000 is substantially the same as the thicknesses of the upper substrate 120, the lower substrate 100, and the sealant 130 combined.

The supporting spacers 140 are interposed between the lower substrate 100 and the upper substrate 120 to maintain a distance between the lower and upper substrates 100 and 120.

When pressure is not applied to the supporting spacers 140 in a vertical direction of the touch screen panel 1000, each of the supporting spacers 140 has substantially the same height. In one exemplary embodiment, the supporting spacers 140 are spaced apart from each other by a constant distance. Exemplary embodiments of the supporting spacers 140 may have a circular cross-section, a rectangular cross-section, a hexagonal cross-section, and other cross-sectional shapes as would be known to one of ordinary skill in the art.

In one exemplary embodiment, the supporting spacers 140 may include synthetic resin. Exemplary embodiments also include configurations wherein the supporting spacers 140 include a photoresist, and are formed through a photolithography process having an exposing process and a developing process. In one exemplary embodiment, the height of the supporting spacers 140 may be about 4.6 μm to about 4.9 μm.

In the present exemplary embodiment, the conductive spacers 150 are protruded from the upper substrate 120 toward the lower substrate 100. In one exemplary embodiment, the conductive spacers 150 include a plurality of spacers of various heights and widths. In one such exemplary embodiment, the size of the conductive spacers 153 adjacent to a center of the upper substrate 120 is smaller than that of the conductive spacers 151 adjacent to a periphery of the upper substrate 120. For example, a width w2 and a length 12 of the conductive spacers 153 substantially adjacent to the center of the upper substrate 120 are smaller than a width w1 and a length 11 of the conductive spacers 151 substantially adjacent to the periphery of the upper substrate 120. Exemplary embodiments of the conductive spacers 150 may have a circular cross-section, a rectangular cross-section, a hexagonal cross-section, and other cross-sectional shapes as would be known to one of ordinary skill in the art.

In an exemplary embodiment wherein the size of the display device is about 12.1 inches, the width w1 and the length 11 of the conductive spacers 151 substantially adjacent to the center of the upper substrate 120 may be about 15 μm and about 4.5 μm, respectively. Also, the width w2 and the length 12 of the conductive spacers 153 substantially adjacent to the periphery of the upper substrate 120 may be about 12 μm and about 4.4 μm.

When the pressure, or touch, of an external objection or the gravitational force is not applied to the touch screen panel 100, the lower and upper substrates 100 and 120 are not bent. When the lower and upper substrates 100 and 120 are not bent, a distance d2 between the conductive spacers 153 substantially adjacent to the center of the upper substrate 120 and the lower substrate 100 is greater than a distance d1 between the conductive spacers 151 adjacent to the periphery of the upper substrate 120 and the lower substrate 100.

Figure 2:
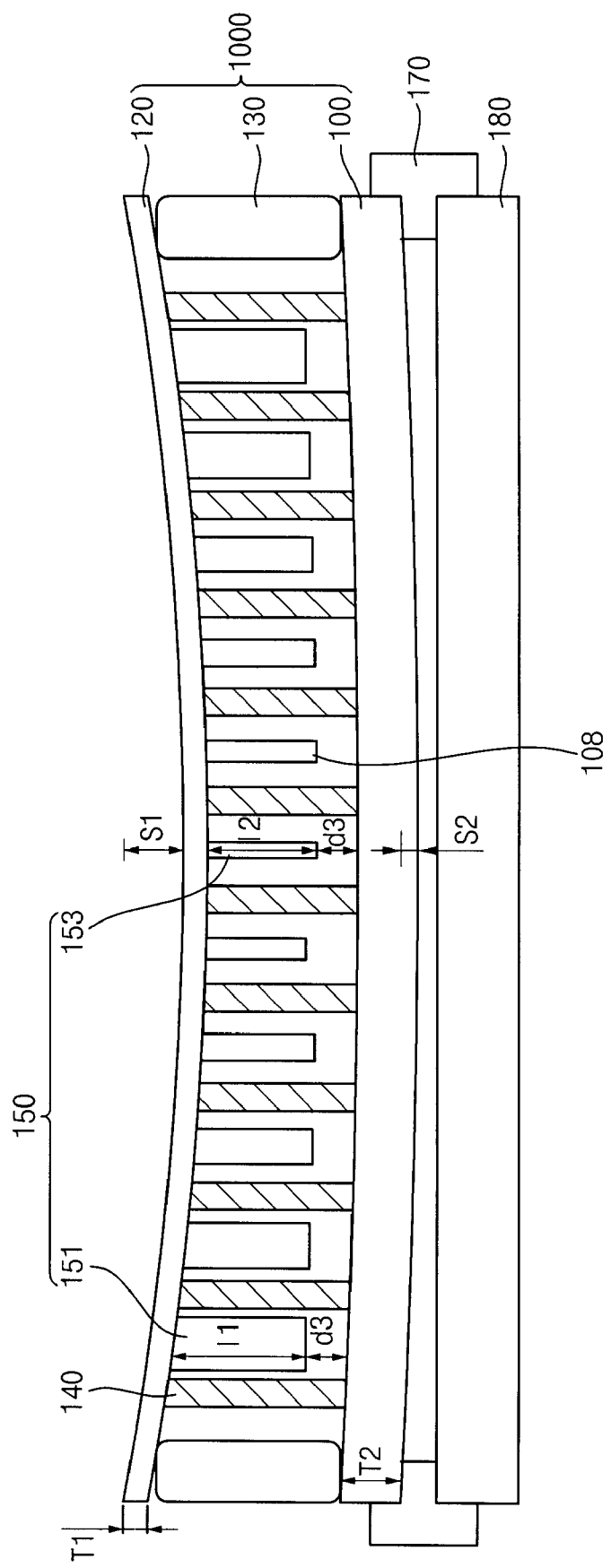
FIG. 2 is a cross-sectional view illustrating the exemplary embodiment of a display device of FIG. 1 after the exemplary embodiment of a display device sags due to the gravitational force.

FIG. 2 is a cross-sectional view illustrating the exemplary embodiment of a display device of FIG. 1 after the exemplary embodiment of a display device sags due to the gravitational force.

Referring to FIG. 2, when the display device is aligned in a direction substantially perpendicular to a gravitational direction, the touch screen panel 1000 is bent in the direction of the applied gravitational force, resulting in sagging.

As shown in FIGS. 1 and 2, a thickness T1 of the upper substrate 120 is different from a thickness T2 of the lower substrate 100, so that the upper and lower substrates 120 and 100 have different elastic constants, and a bending amount S1 of the upper substrate 120 as measured from the center of the upper substrate 120 is different from a bending amount S2 of the lower substrate 100 as measured from the center of the lower substrate 100. Also, when the external pressure is applied onto the touch screen panel 1000, the bending amounts of the upper and lower substrates 120 and 100 may also be different from each other.

In the exemplary embodiment shown in FIG. 2, the thickness T1 of the upper substrate 120 is smaller than the thickness T2 of the lower substrate 100, so that the upper substrate 120 has a smaller elastic coefficient than the lower substrate 100. Thus, the bending amount S1 of the upper substrate 120 may be greater than the bending amount S2 of the lower substrate 100. In one exemplary embodiment, a difference between the bending amount S1 of the upper substrate 120 and the bending amount S2 of the lower substrate 100 may be about 0.1 μm in the direction of the applied gravitational force.

When the touch screen panel 1000 is bent toward the lower direction by sagging, a distance d3 between the conductive spacers 150 and the bent lower substrate 100 may be constant. For example, a distance d3 between the conductive spacers 153 substantially adjacent to the center of the upper substrate 120 may be substantially the same as the distance d3 between the conductive spacers 151 substantially adjacent to the periphery of the upper substrate 120 and the lower substrate 100.

In FIG. 2, the third distance d3 forms a sensing gap between the conductive spacers 150 and the lower substrate 100. In one exemplary embodiment, length of the third distance d3, and therefore also the sensing distance, may be about 0.1 μm to about 0.7 μm for substantially all of the conductive spacers 150. When the sensing gap is less than about 0.1 μm, a short circuit may be formed between the conductive spacers 150 and first and second sensing electrodes ES1 and ES2 (first and second sensing electrodes ES1 and ES2 to be described in more detail below with respect to FIG. 4). When the sensing gap is greater than about 0.7 μm, excessive pressure may be required to contact the conductive spacers 150 with the first and second sensing electrodes ES1 and ES2. In one exemplary embodiment, the sensing gap, that is the third distance d3 between the conductive spacers 150 and the lower substrate 100, maybe about 0.3 μm to about 0.5 μm.

The touch sensitivity of the touch screen panel 1000 may vary in response to the distance between the conductive spacers 150 and the lower substrate 100, so that in the present exemplary embodiment the touching sensitivity of the center of the touch screen panel 1000 is substantially the same as that of the periphery of the touch screen panel 1000.

Figure 3:
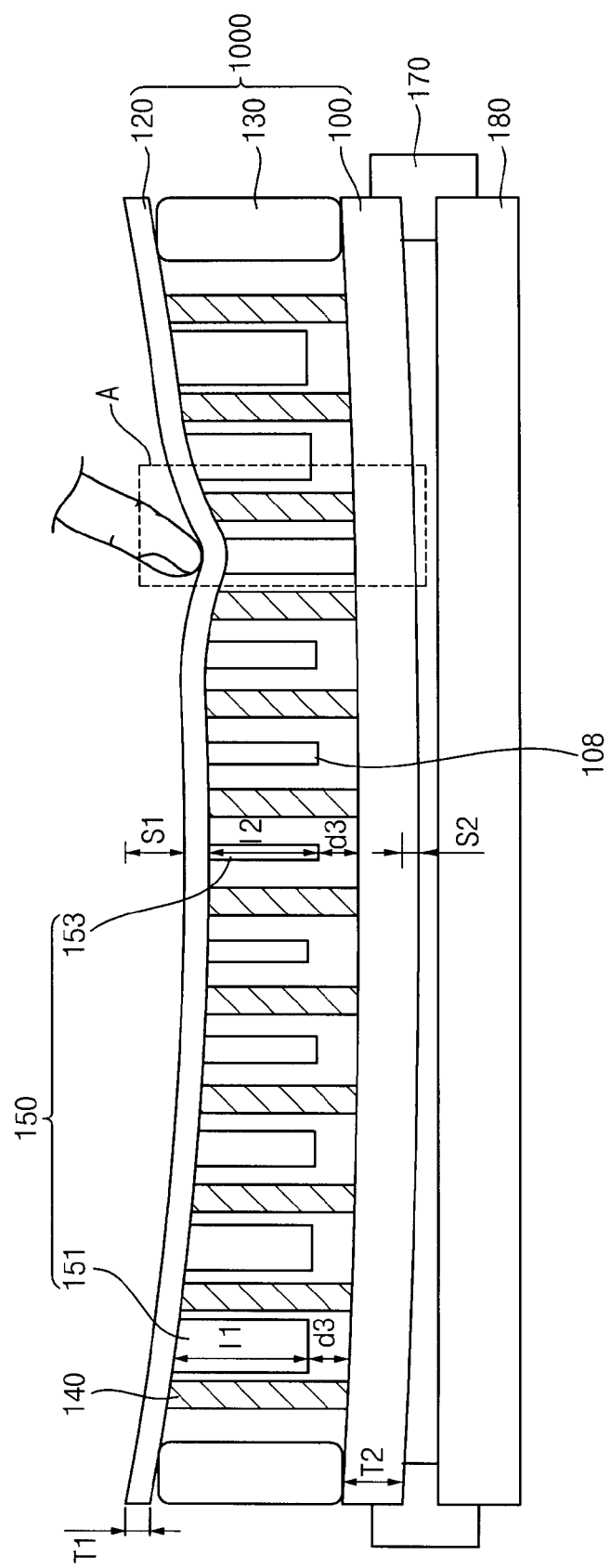
FIG. 3 is a cross-sectional view illustrating the exemplary embodiment of a display device of FIG. 2 after the exemplary embodiment of a display device is pressed by a finger.

FIG. 3 is a cross-sectional view illustrating the exemplary embodiment of a display device of FIG. 2 after the exemplary embodiment of a display device is pressed by a finger.

Referring to FIG. 3, when pressure is applied to a predetermined position of the touch screen panel 1000 by the finger, the pen, etc., a lower surface of the conductive spacer 150 under the predetermined position of the touch screen panel 1000 makes contact with the lower substrate 100.

In FIG. 3, the supporting spacer 140 has a predetermined elastic constant, and the length of the supporting spacer 140 is decreased by the pressure applied to the touch screen panel 100. Thus, the lower surface of the conductive spacer 150 makes contact with the lower substrate 100.

Figure 4:
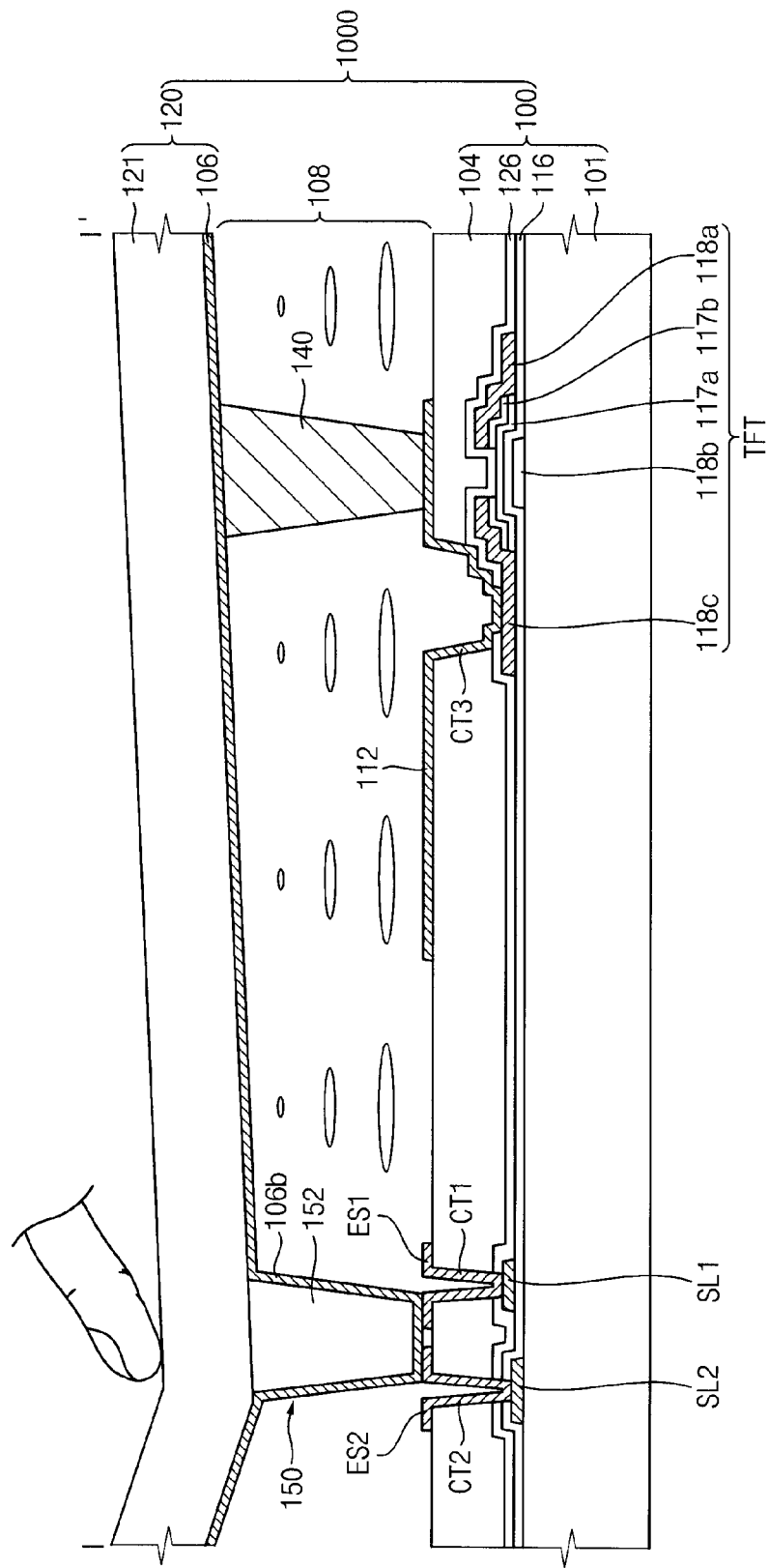
FIG. 4 is an enlarged cross-sectional view illustrating a portion 'A' of the exemplary embodiment of a display device of FIG. 3.
Figure 5:
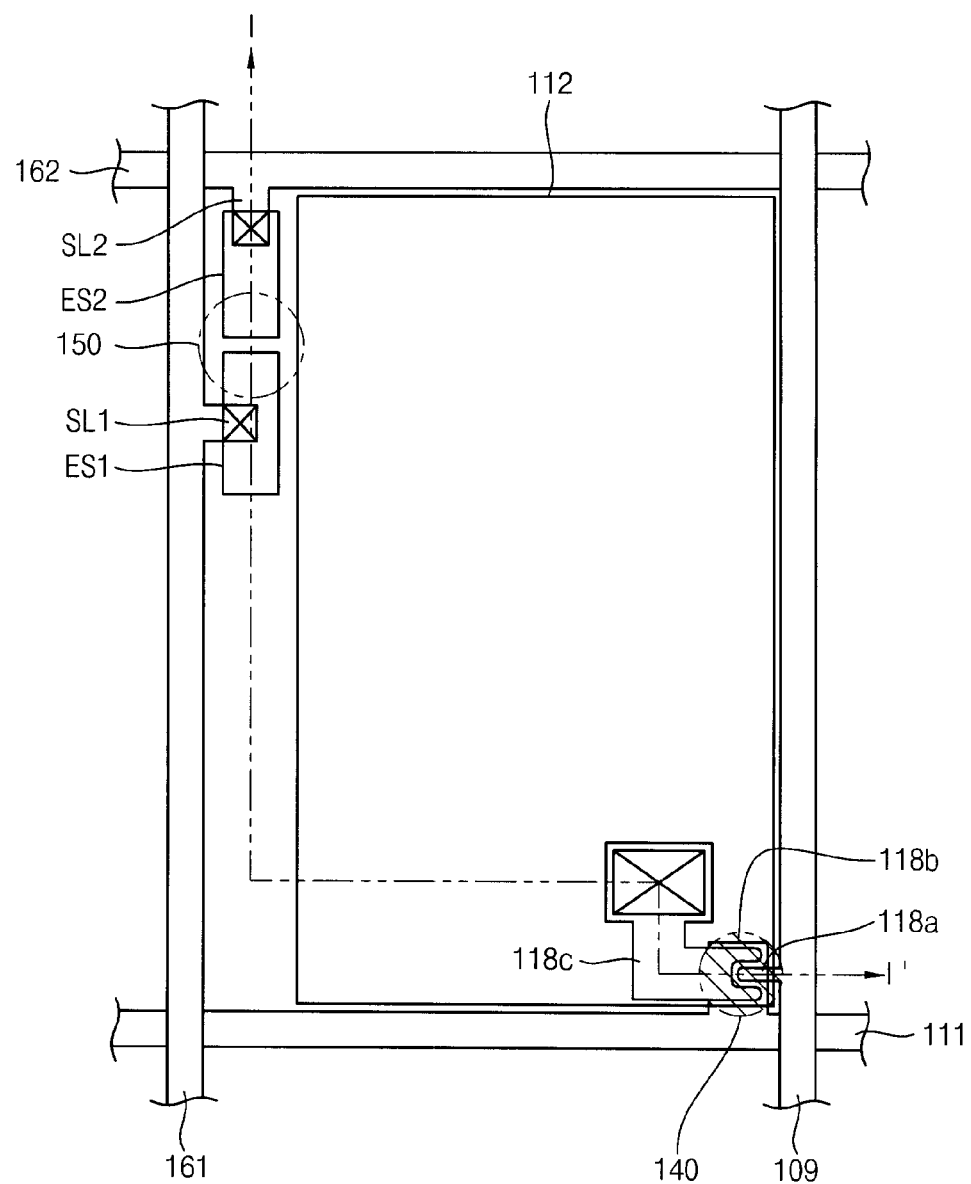
FIG. 5 is a plan view illustrating the exemplary embodiment of a display device shown in FIG. 4.

FIG. 4 is an enlarged cross-sectional view illustrating a portion 'A' of the exemplary embodiment of a display device of FIG. 3. FIG. 5 is a plan view illustrating the exemplary embodiment of a display device shown in FIG. 4.

Referring to FIGS. 4 and 5, the lower substrate 100 includes a lower base substrate 101, a thin-film transistor ("TFT"), a gate insulating layer 116, a passivation layer 126, an organic layer 104, a pixel electrode 112, a gate line 111, a data line 109, a first sensing electrode ES1, a second sensing electrode ES2, a first sensing line 161 and a second sensing line 162.

The TFT is on the lower base substrate 101, and includes a gate electrode 118b, a source electrode 118a, a drain electrode 118c and a semiconductor pattern 117a.

The gate electrode 118b is on the lower base substrate 101, and is electrically connected to the gate line 111. In the present exemplary embodiment, the gate line 111 is formed from the same layer as the gate electrode 118b, and extended in a predetermined direction on the lower base substrate 101.

The second sensing line 162 is extended in a direction substantially parallel with the gate line 111 on the lower base substrate 101, and is electrically connected to a second connection electrode SL2. In the exemplary embodiment shown in FIGS. 4 and 5, the second sensing line 162 is formed from the same layer as the gate line 111. Alternative exemplary embodiments include configurations wherein the second sensing line 162 may be formed from the same layer as the data line 109.

The gate insulating layer 116 is disposed on the lower base substrate 101, and covers the gate electrode 118b, the gate line 111, the second sensing line 162 and the second connection electrode SL2. Exemplary embodiments of an insulating material that may be used for the gate insulating layer 116 include silicon oxide, silicon nitride, various other materials with similar characteristics, or a combination of the above.

The semiconductor pattern 117a is disposed on the gate insulating layer 116 corresponding to the gate electrode 118b. In one exemplary embodiment, the semiconductor pattern 117a includes amorphous silicon. In an alternative exemplary embodiment, the semiconductor pattern 117a may include polysilicon.

In one exemplary embodiment, the TFT may further include an ohmic contact layer 117b disposed on the semiconductor pattern 117a, and a region of the ohmic contact layer 117b between the source electrode 118a and the drain electrode 118c may be removed or omitted. Alternative exemplary embodiments include configurations wherein the entire ohmic contact layer 117b is omitted.

The source electrode 118a is disposed on the ohmic contact layer 117b. In one exemplary embodiment, the data line 109 is formed from the same layer as the source electrode 118a, and crosses the gate line 111.

In the present exemplary embodiment, the first sensing line 161 is disposed substantially parallel with the data line 109, and is electrically connected to a first connection electrode SL1. In the exemplary embodiment shown in FIGS. 4 and 5, the first sensing line 161 is formed from the same layer as the data line 109. Alternative exemplary embodiments include configurations wherein the first sensing line 161 may be formed from the same layer as the gate line 111.

The drain electrode 118c is disposed on the ohmic contact layer 117b and substantially opposite the source electrode 118a with respect to the gate electrode 118b. The passivation layer 126 is disposed on the gate insulating layer 116, and covers the source electrode 118a, the drain electrode 118c, the data line 109, the first connection electrode SL1 and the first sensing line 161. Exemplary embodiments of an insulating material that may be used for the passivation layer 126 include silicon oxide, silicon nitride, and various other materials with similar characteristics. Exemplary embodiments also include combinations of the abovementioned materials.

The organic layer 104 is disposed on the passivation layer 126, and planarizes a top surface of the lower substrate 100.

The pixel electrode 112 is disposed on the organic layer 104, and is electrically connected to the drain electrode 118c through a third contact hole CT3. In one exemplary embodiment, the third contact hole CT3 is formed passing through the organic layer 104 and the passivation layer 126 to partially expose the drain electrode 118c.

When a gate signal and a data signal are applied to the gate electrode 118b and the source electrode 118a, respectively, a channel is formed in the semiconductor pattern 117a to transmit the data signal to the pixel electrode 112 through the drain electrode 118c.

In FIGS. 4 and 5, exemplary embodiments of a transparent conductive material that may be used for the pixel electrode 112 include indium tin oxide ("ITO"), indium zinc oxide ("IZO") and various other materials with similar characteristics. In an alternative exemplary embodiment, the pixel electrode 112 may include a highly reflective material, or may include a structure having a transmission part composed of a transparent conductive material and a reflection part electrically connected to the transmission part and being composed of a highly reflective material.

The first sensing electrode ES1 is disposed on the organic layer 104, and is electrically connected to the first sensing line 161 through a first contact hole CT1 and a first connection electrode SL1. In FIGS. 4 and 5, the first contact hole CT1 is formed passing through the organic layer 104 and the passivation layer 126 to partially expose the first connection electrode SL1.

The second sensing electrode ES2 is disposed on the organic layer 104, and is electrically connected to the second sensing line 162 through a second contact hole CT2 and the second connection electrode SL2. In FIGS. 4 and 5, the second contact hole CT2 is formed passing through the organic layer 014, the passivation layer 126 and the gate insulating layer 116 to partially expose the second connection electrode SL2.

The upper substrate 120 faces the lower substrate 100, and includes an upper base substrate 121 and a common electrode 106. The common electrode 106 is disposed on the upper base substrate 121, and faces the pixel electrode 112. In the exemplary embodiment shown in FIGS. 4 and 5, the common electrode 106 includes a transparent conductive material.

When an electric field is formed between the pixel electrode 112 and the common electrode 106, arrangement of liquid crystals of the liquid crystal layer 108 varies in response to the electric field, thereby changing light transmittance of the liquid crystal layer 108.

The supporting spacers 140 are interposed between the upper substrate 120 and the lower substrate 100 to maintain the distance between the upper substrate 120 and the lower substrate 100. In the exemplary embodiment shown in FIGS. 4 and 5, the supporting spacers 140 have a predetermined elastic constant, and the length of the supporting spacers 140 may be decreased by externally applying pressure along the lower direction.

In the exemplary embodiment shown in FIGS. 4 and 5, the supporting spacers 140 include column spacers. Alternative exemplary embodiments of the supporting spacers 140 may include bead spacers. In such an alternative exemplary embodiment, the supporting spacers 140 may include a bead spacer group attached to the upper substrate through a synthetic resin (not shown).

Each of the conductive spacers 150 includes a protrusion 152 protruded from the upper base substrate 121 and a conductive layer 106b which covers the protrusion 152 and is electrically connected to the common electrode 106. In the exemplary embodiment shown in FIGS. 4 and 5, the conductive layer 106b is formed from the same layer as the common electrode 106.

The conductive spacers 150 have a smaller length than the supporting spacers 140. When the externally provided pressure is not applied to the touch screen panel 1000, the lower surface of the conductive spacer 150 is spaced apart from the lower substrate 100 by a predetermined distance. However, when the pressure is applied to the upper substrate 120 by the finger, the pen, etc., the lower surface of the conductive spacer 150 under the pressurized portion of the upper substrate 120 makes contact with the first sensing electrode ES1 and the second sensing electrode ES2, so that the first sensing electrode ES1 is electrically connected to the second sensing electrode ES2 through the conductive layer 106b on the conductive spacer 150. When the first sensing electrode ES1 is electrically connected to the second sensing electrode ES2, the first sensing line 161, which is electrically connected to the first sensing electrode ES1 through the first connection electrode EL1, is electrically connected to the second sensing line 162, which is electrically connected to the second sensing electrode ES2 through the second connection electrode EL2. Thus, the pressurized position is detected by interpreting the position of the first and second sensing electrodes ES1 and ES2.

In the exemplary embodiment shown in FIGS. 4 and 5, the touch screen panel 1000 senses the position by direct connection between the conductive spacer 150 and the first and second sensing electrodes ES1 and ES2. In an alternative exemplary embodiment, the conductive spacer 150 of the touch screen panel 1000 may not directly contact with the sensing electrodes, but the pressurized position may be detected by capacitance variation between the lower surface of the conductive spacer 150 and the sensing electrode. That is, the touch screen panel 1000 may be a capacitance sensing type touch screen panel.

The upper substrate 120 may further include a black matrix (not shown) that blocks light incident into a region in which the liquid crystals are not directly controlled by the electric field generated between the pixel electrode 112 and the common electrode 106.

FIGS. 6 to 10 are cross-sectional views illustrating an exemplary embodiment of a method of manufacturing the exemplary embodiment of a display device shown in FIG. 1.

Figure 6:
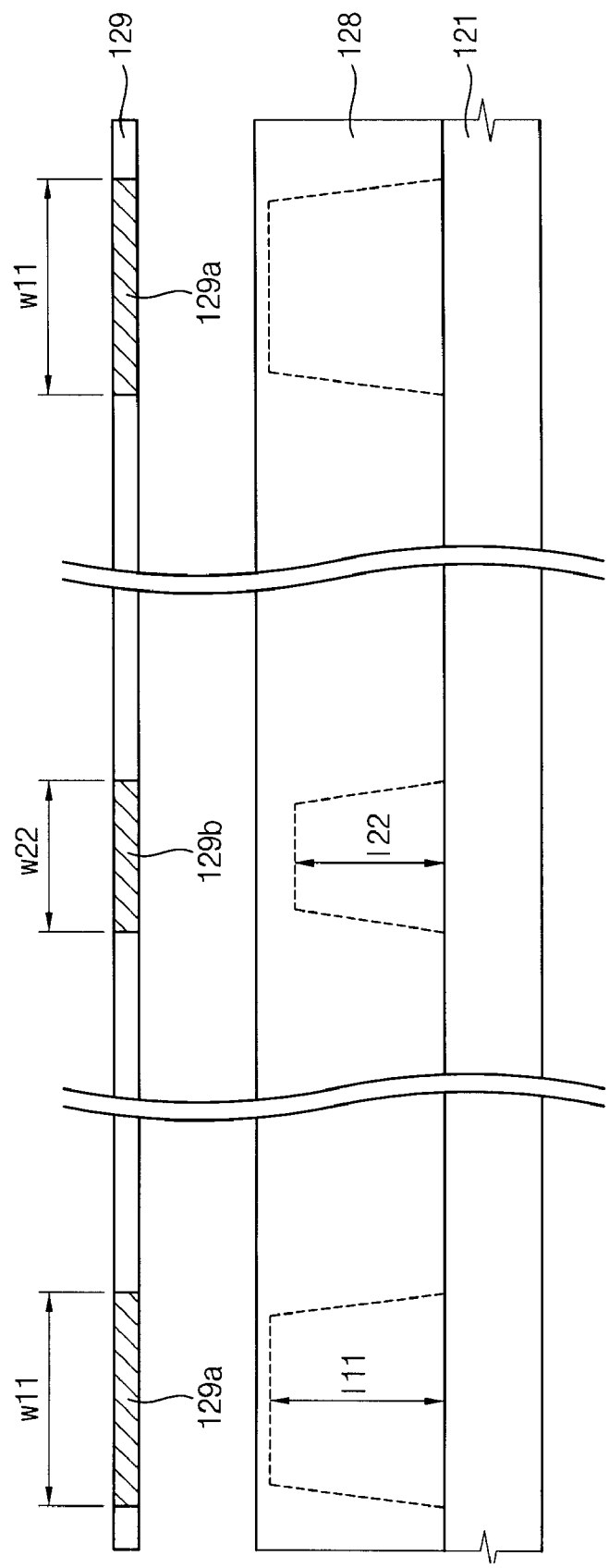
FIGS. 6 to 10 are cross-sectional views illustrating an exemplary embodiment of a method of manufacturing the exemplary embodiment of a display device shown in FIG. 1.

FIG. 6 is a cross-sectional view illustrating an exemplary method of exposing a material layer of a first organic material.

Referring to FIGS. 4, 5 and 6, in order to manufacture the above described exemplary embodiment of a display device, a first organic material is coated on the upper base substrate 121 to form a material layer 128 including the first organic material. For example, the material layer 128 of the first organic material includes a photoresist. The material layer 128 of the first organic material is exposed through a mask 129 having reticles 129a and 129b corresponding to the conductive spacers 150.

Figure 7:
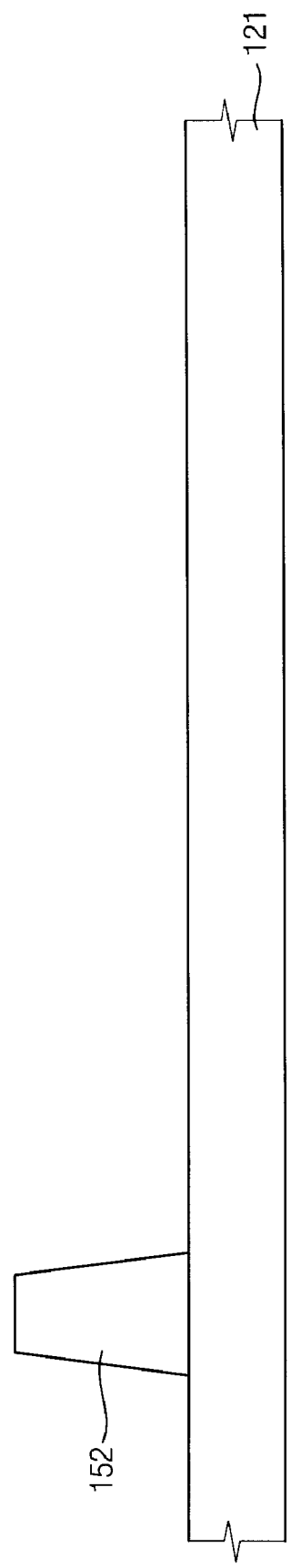

FIG. 7 is a cross-sectional view illustrating an exemplary embodiment of a method of developing the material layer of FIG. 6. Referring to FIG. 7, the material layer 128 of the first organic material is developed to form the protrusions 152.

Referring again to FIGS. 6 and 7, widths w11 and w22 of the reticles 129a and 129b, respectively, are adjusted to control the size and height of the protrusions 152. In one exemplary embodiment, when the width w11 of the reticle corresponding to the conductive spacers 151 substantially adjacent to the periphery of the upper substrate 120 is about 15 µm, the height 111 of the protrusion 152 formed through the photo process may be about 4.5 µm. Also, when the screen size of the display device is about 12.1 inches, the width w22 of the reticle corresponding to the conductive spacers 153 substantially adjacent to the center of the upper substrate 120 is about 12 µm, and the height 122 of the protrusion 152 formed through the photo process is about 4.4 µm.

In an exemplary embodiment wherein the size of the display device is greater than about 12.1 inches, the width w22 of the reticle corresponding to the conductive spacers 153 adjacent to the center of the upper substrate 120 may be about 10 µm to about 7 µm, and the height 122 of the protrusion 152 formed through the photo process may be about 4.2 µm to about 3.4 µm.

Although not intending to be bound by theory, one possible reason as to why the size and height of the protrusions 152 are changed in response to the size of the reticles of the present embodiment of the present invention will be described as follows. Ultraviolet light is diffracted on a periphery of the reticle 129a or 129b. The amount of the diffraction is increased as the size of the reticle is decreased. Thus, the amount of the exposure on the material layer 128 of the first organic material is increased. Also, the protrusion 152 may be exposed by an etchant during the development process, the etchant removing the material layer 128 that was not exposed to the ultraviolet light. The etchant may also remove a small portion of the exposed material layer 128 and therefore the size of the protrusion 152 is decreased accordingly. Thus, the height of the protrusion 152 may be decreased, as the amount of the exposure to the etchant is increased. Furthermore, the height of the developed protrusion 152 may also be decreased due to a reflowing phenomenon during solidification of the developed protrusion 152.

In the exemplary embodiment shown in FIG. 7, the protrusion 152 is formed through the photo-development process. Alternative exemplary embodiments include configurations wherein the protrusion 152 may be formed through a printing method, a grinding method, or other methods as known to one of ordinary skill in the art.

Figure 8:
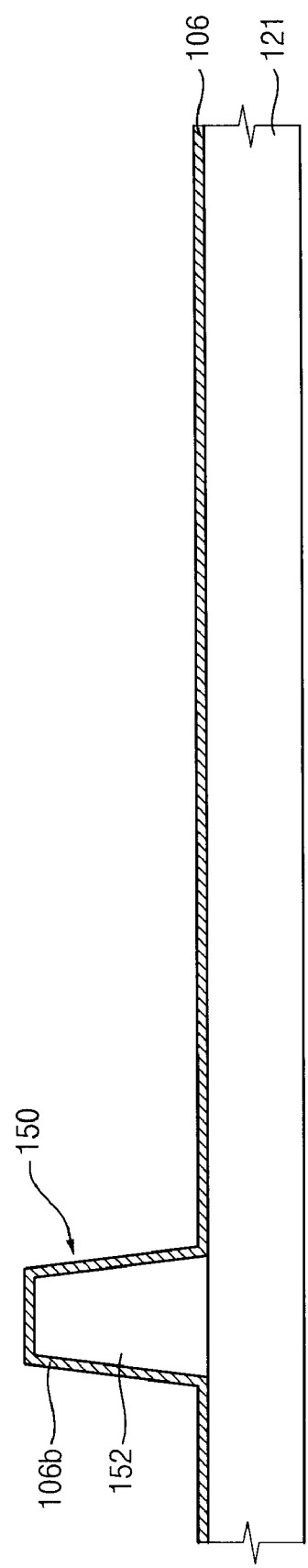

FIG. 8 is a cross-sectional view illustrating an exemplary embodiment of a method of forming the common electrode 106 and the conductive layer 106b on the exemplary embodiment of a base substrate of FIG. 7. Referring to FIGS. 5 and 8, a transparent conductive material is deposited on the upper base substrate 121 having the protrusions 152 to form the common electrode 106 and the conductive layer 106b. The conductive layer 106b covers the protrusions 152 to form the conductive spacers 150.

Figure 9:
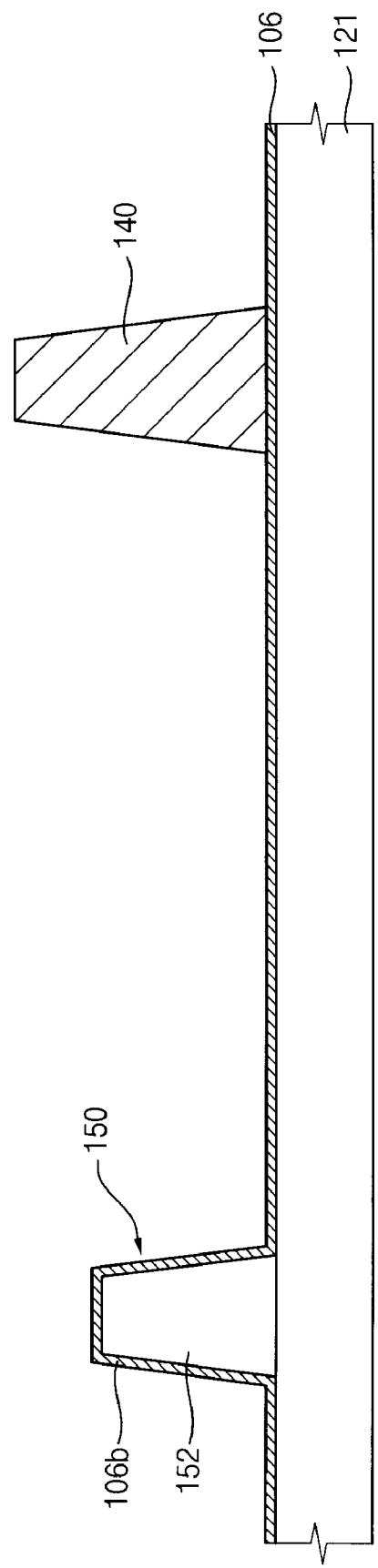

FIG. 9 is a cross-sectional view illustrating an exemplary embodiment of a method of forming the supporting spacers 140 on the exemplary embodiment of an upper base substrate shown in FIG. 8. Referring to FIGS. 5 and 9, a material layer (not shown) of a second organic material is coated on the upper base substrate 121 having the conductive spacers 150 and the common electrode 106. In the exemplary embodiment shown in FIG. 9, the second organic material includes photoresist.

The material layer of the second organic material is exposed through a mask (not shown) having reticles (not shown) corresponding to the supporting spacers 140. The exposed material layer of the second organic material is developed to form the supporting spacers 140. In an alternative exemplary embodiment, the material layer of the second organic material does not include the photoresist, and the supporting spacers 140 are formed through a photolithography process.

Therefore, the upper substrate 120 including the upper base substrate 121, the conductive spacers 150, the supporting spacers 140 and the common electrode 106 is completed.

Figure 10:
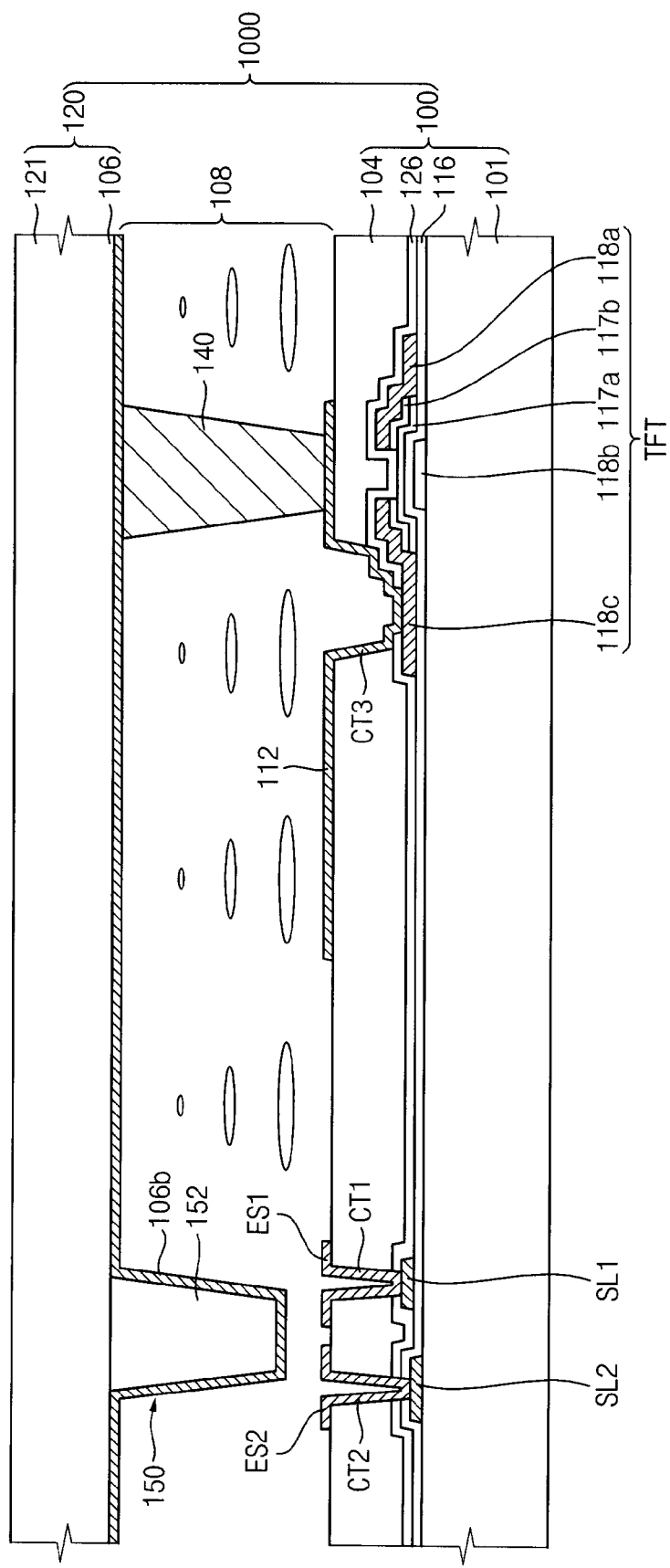

FIG. 10 is a cross-sectional view illustrating combining the upper substrate 120 of FIG. 9 with the lower substrate 110.

Referring to FIGS. 5 and 10, the gate electrode 118b of the TFT, the gate line 111, the second connection electrode SL2 and the second connecting line 162 are formed on the lower base substrate 101. The gate insulating layer 116 is formed on the lower base substrate 101 to cover the gate electrode 118b, the gate line 111, the second connection electrode SL2 and the second connecting line 162. The semiconductor pattern 117a and the ohmic contact layer 117b are formed on the gate insulating layer 116.

The source electrode 118a contacts a first part of the ohmic contact layer 117b and the drain electrode 118c contacts a second part of the ohmic contact layer 117b that is spaced apart from the source electrode 118a. In one exemplary embodiment, the data line 109, the first connection electrode SL1 and the first connecting line 161 are formed on the gate insulating layer 116 having the semiconductor pattern 117a and the ohmic contact layer 117b formed thereon. In an alternative exemplary embodiment, the data line 109, the first connection electrode SL1 and the first connecting line 161 may be disposed on the gate insulating layer before the semiconductor pattern 117a and the ohmic contact layer 117b are disposed on the gate insulating layer 116.

The passivation layer 126 is formed on the gate insulating layer 116 to cover the TFT, the data line 109, the first connection electrode SL1 and the first connecting line 161. An organic layer 104 is formed on the passivation layer 126.

Next, the first contact hole CT1, the second contact hole CT2 and the third contact hole CT3 are formed. The first contact hole CT1 passes through the organic layer 104 and the passivation layer 126 to partially expose the first connection electrode SL1. The second contact hole CT2 passes through the organic layer 104, the passivation layer 126 and the gate insulating layer 116 to partially expose the second connection electrode SL2. The third contact hole CT3 passes through the organic layer 104 and the passivation layer 126 to partially expose the drain electrode 118c.

A transparent conductive material is deposited on an upper surface of the organic layer 104, and inner surfaces of the first to third contact holes CT1, CT2 and CT3 to form a transparent conductive layer (not shown). The transparent conductive layer is partially removed through a photolithography process to form the pixel electrode 112, the first sensing electrode ES1 and the second sensing electrode ES2. Alternative exemplary embodiments include configurations wherein the pixel electrode 112, the first sensing electrode ES1 and the second sensing electrode ES2 are separately disposed on the organic layer 4, e.g., the different components are formed individually and then separately positioned onto the organic layer 4.

Thus, the lower substrate 100 having the lower base substrate, the TFT, the gate insulating layer 116, the passivation layer 126, the organic layer 104, the pixel electrode 112, the gate line 111, the data line 109, the first sensing electrode ES1, the second sensing electrode ES2, the first sensing line 161 and the second sensing line 162 is completed.

The liquid crystal layer 108 is formed between the upper substrate 120 and the lower substrate 100 to seal the liquid crystal layer 108 by the sealant 130 (shown in FIG. 3).

Referring again to FIG. 3, the backlight assembly 180 is prepared, and the touch screen panel 1000 is combined with the backlight assembly 180 using the receiving container 170.

According to the present exemplary embodiment, the height of the conductive spacers 150 is adjusted to compensate for the difference between the bending amounts of the upper and lower substrates 120 and 100. Thus, uniformity of the touching sensitivity of the touch screen panel 1000 is increased, and malfunction of the sensors that sense the externally provided pressure is decreased.

Figure 11:
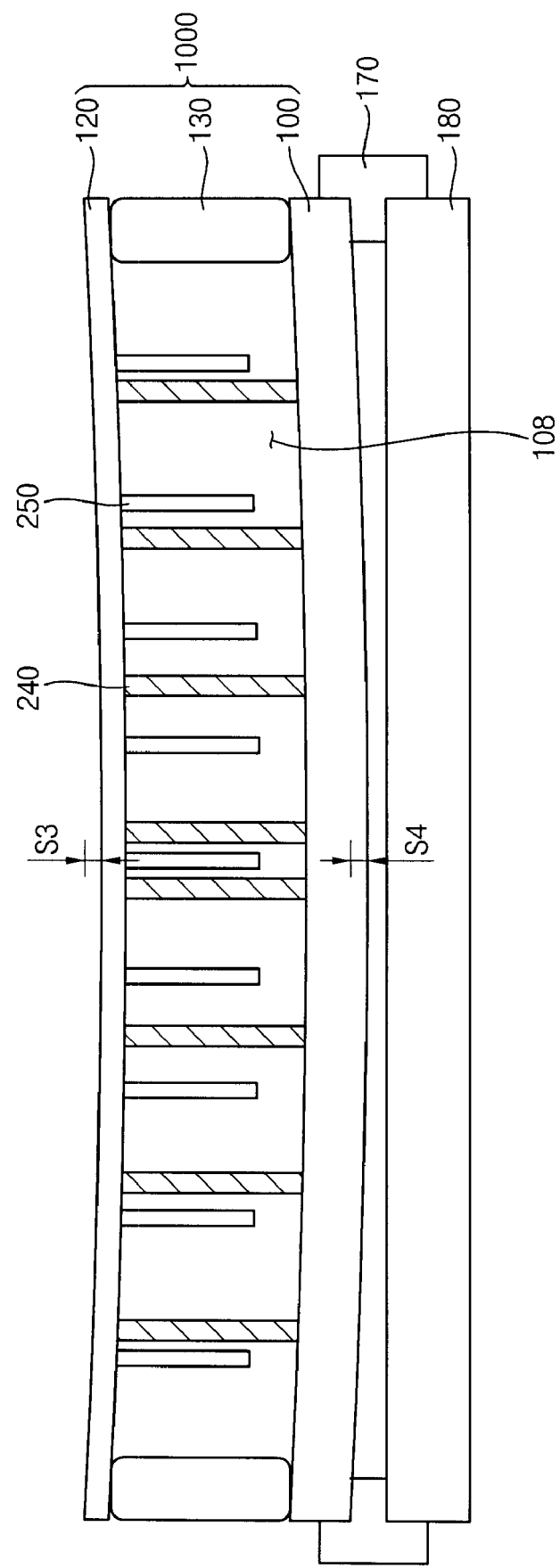
FIG. 11 is a cross-sectional view illustrating another exemplary embodiment of a display device in accordance with the present invention.

FIG. 11 is a cross-sectional view illustrating another exemplary embodiment of a display device in accordance with the present invention. The display device of FIG. 11 is substantially the same as the display device of FIGS. 1 to 10 except supporting spacers 240 and conductive spacers 250. Thus, the same reference numerals will be used to refer to the same or like parts as those described in FIGS. 1 to 10 and any further repetitive explanation concerning the above elements will be omitted.

Referring to FIG. 11, a density of the supporting spacers 240 is increased as the distance from a center of the touch screen panel is decreased. When the density of the supporting spacers 240 adjacent to the center of the touch screen panel is greater than that of the supporting spacers 240 adjacent to a periphery of the touch screen panel, a central portion of the touch screen panel has greater supporting strength than a peripheral portion of the touch screen panel.

In FIG. 11, the supporting spacers 240 correspond to pixel electrodes 112 (shown in FIG. 5) of the lower substrate 100, respectively. In one exemplary embodiment, each of the supporting spacers 240 may be formed on each of a plurality of pixels. In an alternative exemplary embodiment, each of the supporting spacers 240 may be formed on every three pixels.

Therefore, a bending amount S3 of the upper substrate 120 is substantially the same as a bending amount S4 of the lower substrate 100, and the distance between the upper and lower substrates 120 and 100 is substantially constant.

The conductive spacers 250 adjacent to the center of the touch screen panel may have substantially the same length as the conductive spacers 250 adjacent to the periphery of the touch screen panel. In the exemplary embodiment shown in FIG. 11, the height of the conductive spacers 250 is about 4.5 μm. Alternatively, the length of the conductive spacers 250 adjacent to the center of the touch screen panel may be less than that of the conductive spacers 250 adjacent to the periphery of the touch screen panel.

According to the present embodiment, the density of the supporting spacers 240 is adjusted so that the lower substrate 100 has a same bending amount as the upper substrate 120. Thus, the uniformity of the touching sensitivity of the touch screen panel is increased.

Figure 12:
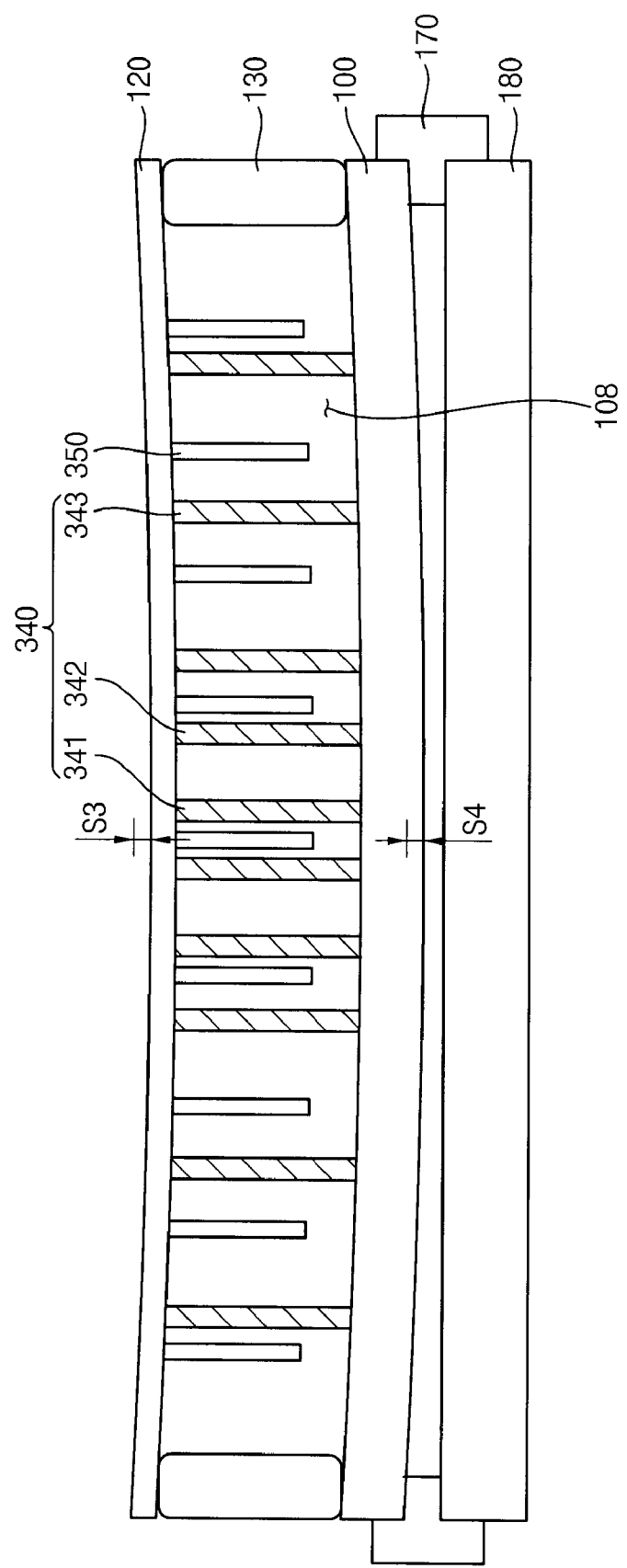
FIG. 12 is a cross-sectional view illustrating another exemplary embodiment of a display device in accordance with the present invention.
Figure 13:
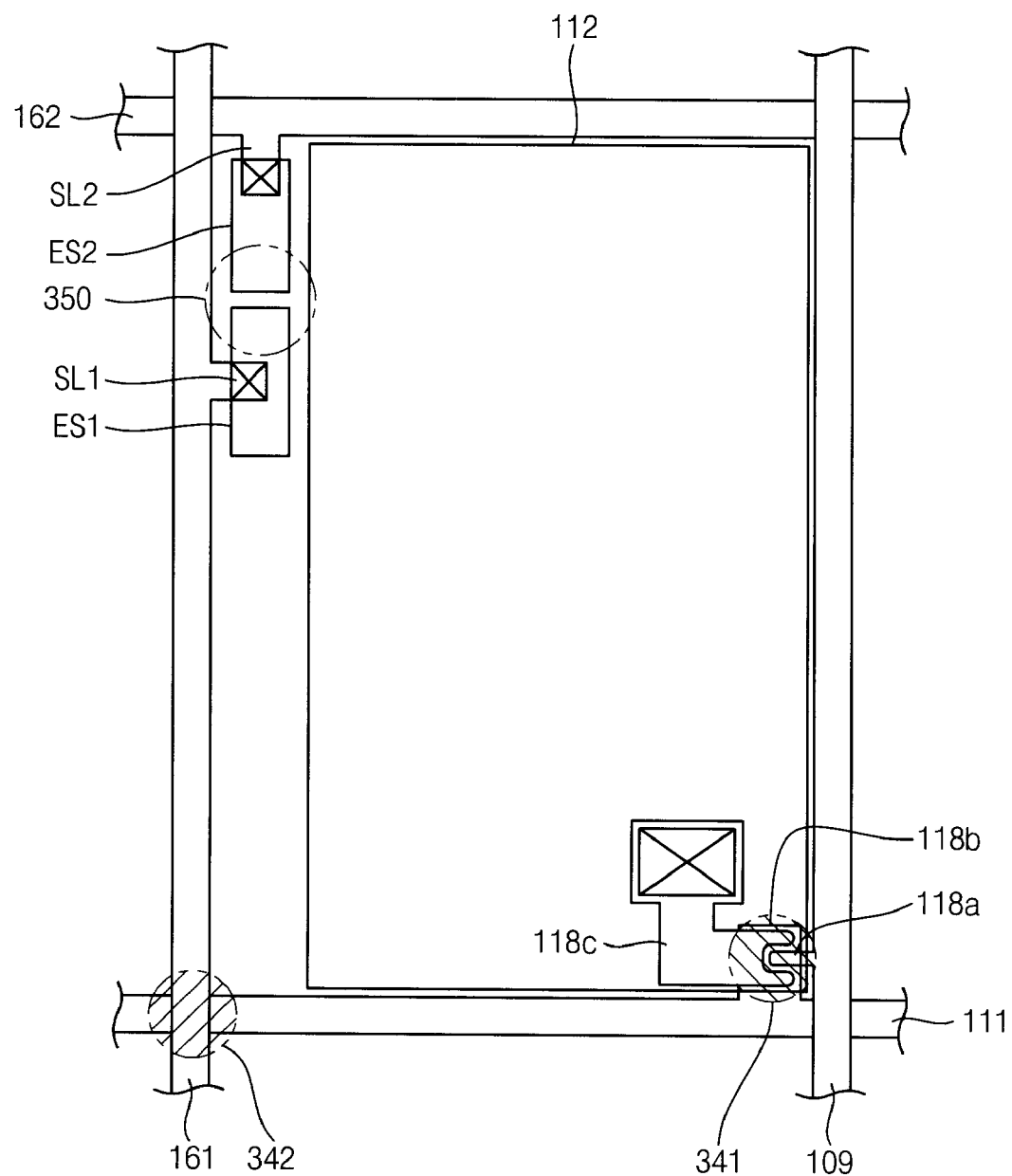
FIG. 13 is an enlarged plan view illustrating a portion of the exemplary embodiment of a display device shown in FIG. 12.

FIG. 12 is a cross-sectional view illustrating another exemplary embodiment of a display device in accordance with still another embodiment of the present invention, and FIG. 13 is an enlarged plan view illustrating a portion of the exemplary embodiment of a display device of FIG. 12. The exemplary embodiment of a display device of FIGS. 12 and 13 is substantially the same as the exemplary embodiment of a display device of FIG. 11 except supporting spacers 340. Thus, the same reference numerals will be used to refer to the same or like parts as those described in FIG. 11 and any further repetitive explanation concerning the above elements will be omitted.

Referring to FIGS. 12 and 13, a density of the supporting spacers 340 increases with proximity to a center of the touch screen panel.

In the present exemplary embodiment, each of pixel electrodes 112 substantially adjacent to the center of the touch screen panel corresponds to two supporting spacers 341 and 342. In FIGS. 12 and 13, a first supporting spacer 341 corresponds to a TFT formation location, and a second supporting spacer 342 corresponds to a region between adjacent pixel electrodes 112. For example, the second supporting spacer 342 is in a region in which a gate line 111 crosses a first sensing line 161. Alternative exemplary embodiments include configurations wherein more than three supporting spacers may be formed on each pixel.

Each of the pixel electrodes 112 substantially adjacent to the periphery of the touch screen panel corresponds to a third supporting spacer 343 of the supporting spacers 340.

According to the present exemplary embodiment, the density of the supporting spacers 340 is adjusted so that the lower substrate 100 has substantially a same bending amount as the upper substrate 120. Also, a density of the supporting spacers 341 and 342 substantially adjacent to the center of the touch screen panel is greater than that of FIG. 11, so that the uniformity of the touching sensitivity of the touch screen panel is increased when the amount of the externally provided pressure is increased.

Figure 14:
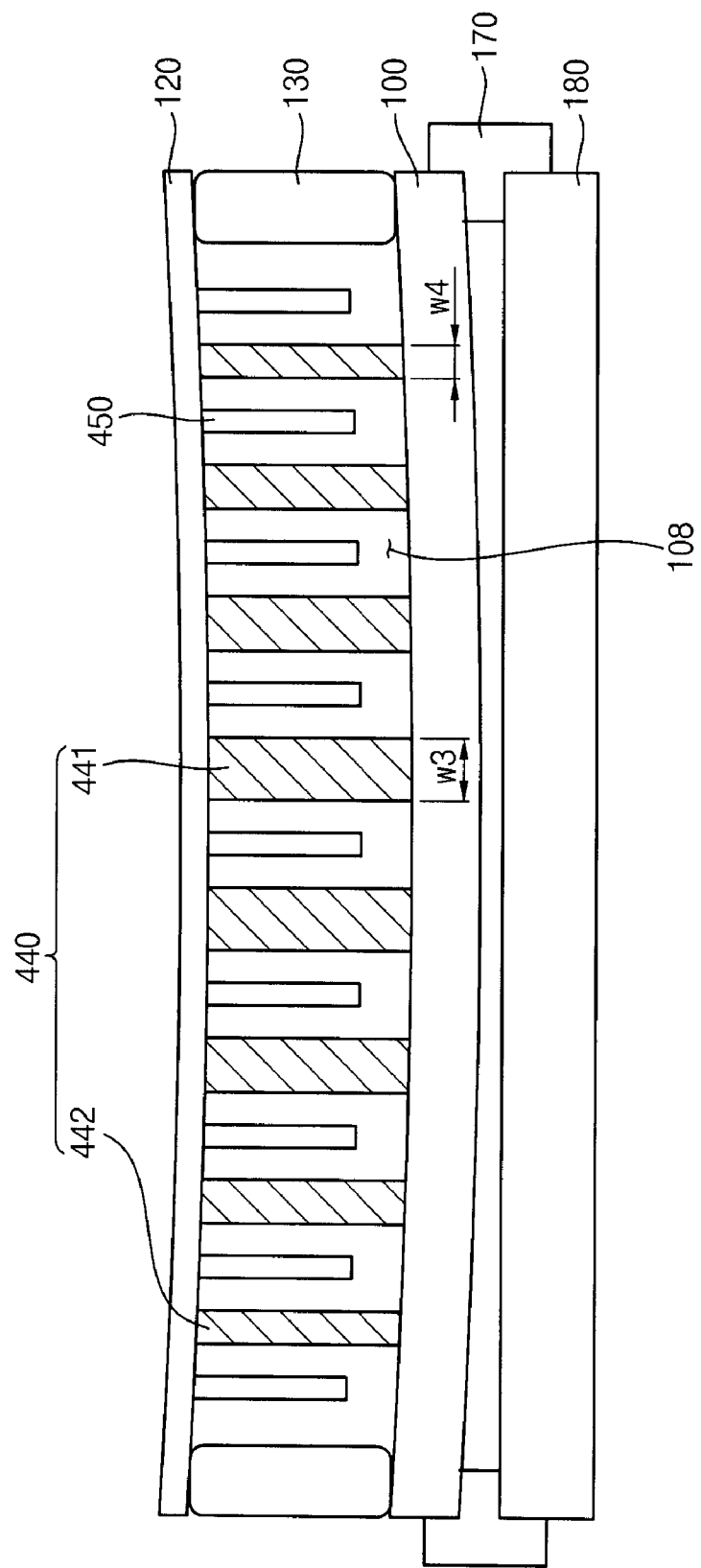
FIG. 14 is a cross-sectional view illustrating another exemplary embodiment of a display device in accordance with the present invention.

FIG. 14 is a cross-sectional view illustrating another exemplary embodiment of a display device in accordance with the present invention. The exemplary embodiment of a display device of FIG. 14 is substantially the same as the exemplary embodiment of a display device of FIG. 11 except supporting spacers 440. Thus, the same reference numerals will be used to refer to the same or like parts as those described in FIG. 11 and any further repetitive explanation concerning the above elements will be omitted.

Referring to FIG. 14, the size of the supporting spacers 440 is increased with proximity to a center of the touch screen panel. For example, a width w3 of the supporting spacers 441 substantially adjacent to the center of the touch screen panel is greater than a width w4 of the supporting spacers 442 substantially adjacent to the periphery of the touch screen panel, so that the mechanical strength of a central portion of the touch screen panel is greater than that of a peripheral portion of the touch screen panel. In one exemplary embodiment, the supporting spacers 440 may be formed through a photo process or a photolithography process.

Therefore, the upper substrate 120 has a same bending amount as the lower substrate 100, so that the distance between the upper and lower substrates 120 and 100 may be substantially constant.

According to the present exemplary embodiment, the size of the supporting spacers 440 is adjusted so that the lower substrate 100 has substantially the same bending amount as the upper substrate 120. Therefore, the uniformity of the touching sensitivity of the touch screen panel is increased.

According to an exemplary embodiment of an upper substrate, an exemplary embodiment of a method of manufacturing the upper substrate and an exemplary embodiment of a display device having the upper substrate of the present invention, height of conductive spacers may be adjusted to compensate for differences between the bending amounts of the upper and lower substrates. Thus, uniformity of touching sensitivity of the touch screen panel is improved, and malfunction of sensors that sense externally provided pressure is decreased.

In addition, in another exemplary embodiment, density of the supporting spacers may be adjusted so that the lower substrate has substantially the same bending amount as the upper substrate. Furthermore, in such an exemplary embodiment, two supporting spacers may be disposed on each pixel substantially adjacent to a center of the touch screen panel, so that the uniformity of the touching sensitivity is improved although an amount of the externally provided pressure is increased.

Furthermore, in another exemplary embodiment, the size of the supporting spacers may be adjusted, so that the lower substrate has substantially the same bending amount as the upper substrate.

Alternatively, any combination of the above exemplary embodiments may be combined into a single apparatus.

Therefore, the uniformity of the touching sensitivity of the touch screen panel is increased, and the malfunction of the sensors is decreased.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. An upper substrate for a touch screen panel, the upper substrate comprising:
   an upper base substrate;
   a plurality of conductive spacers disposed on the upper base substrate, a height of the conductive spacers substantially adjacent to a center of the upper base substrate being smaller than a height of the conductive spacers substantially adjacent to a periphery of the upper base substrate;
   a common electrode disposed on the upper base substrate; and
   a plurality of supporting spacers disposed between the conductive spacers on the common electrode, the supporting spacers having a height greater than the height of the conductive spacers.

2. The upper substrate of claim 1, wherein a width of the conductive spacers substantially adjacent to the periphery of the upper base substrate is greater than a width of the conductive spacers substantially adjacent to the center of the upper base substrate.

3. The upper substrate of claim 2, wherein the width and the height of the conductive spacers substantially adjacent to the periphery are about 15 μm and about 4.5 μm, respectively, and the width and the height of the conductive spacers substantially adjacent to the center are about 12 μm and about 4.4 μm, respectively.

4. The upper substrate of claim 3, wherein the height of the supporting spacers is about 4.6 μm.

5. The upper substrate of claim 1, wherein a density of the supporting spacers substantially adjacent to the center is greater than a density of the supporting spacers substantially adjacent to the periphery.

6. The upper substrate of claim 1, wherein each of the conductive spacers comprises:
a protrusion protruded from the upper base substrate; and
a conductive layer which substantially covers the protrusion and is electrically connected to the common electrode.

7. An upper substrate for a touch screen panel, the upper substrate comprising:
an upper base substrate;
a plurality of conductive spacers which protrude from the upper base substrate;
a common electrode disposed on the upper base substrate; and
a plurality of supporting spacers disposed between the conductive spacers on the common electrode, the supporting spacers having a greater height than the conductive spacers, a distance between adjacent conductive spacers substantially adjacent to a center of the upper base substrate being smaller than a distance between adjacent conductive spacers substantially adjacent to a periphery of the upper base substrate.

8. The upper substrate of claim 7, wherein the conductive spacers have a substantially constant height and a substantially constant width.

9. The upper substrate of claim 7, wherein a height and a width of the conductive spacers substantially adjacent to the center are smaller than a height and a width of the conductive spacers substantially adjacent to the periphery.

10. A display device comprising:
an upper substrate including:
an upper base substrate;
a plurality of conductive spacers disposed on the upper base substrate, a height of the conductive spacers substantially adjacent to a center of the upper base substrate being smaller than a height of the conductive spacers substantially adjacent to a periphery of the upper base substrate;
a common electrode disposed on the upper base substrate; and
a plurality of supporting spacers disposed between the conductive spacers on the common electrode, the supporting spacers having a greater height than the conductive spacers;
a lower substrate facing the upper substrate, the lower substrate comprising:
a lower base substrate;
a plurality of pixel electrodes disposed on the lower base substrate substantially opposite to the common electrode; and
a plurality of thin-film transistors disposed on the lower base substrate, the thin-film transistors being electrically connected to the pixel electrodes; and
a liquid crystal layer interposed between the upper substrate and the lower substrate.

11. The display device of claim 10, wherein a width of the conductive spacers substantially adjacent to the periphery of the upper base substrate is greater than a width of the conductive spacers substantially adjacent to the center of the upper base substrate.

12. The display device of claim 10, wherein a density of the supporting spacers substantially adjacent to the center of the upper base substrate is greater than a density of the supporting spacers substantially adjacent to the periphery of the upper base substrate.

13. The display device of claim 12, wherein at least one supporting spacer of the plurality of supporting spacers corresponds to an individual thin-film transistor of the plurality of thin-film transistors.

14. The display device of claim 10, wherein a width of the supporting spacers substantially adjacent to the center of the upper base substrate is greater than a width of the supporting spacers substantially adjacent to the periphery of the upper base substrate.

15. The display device of claim 10, wherein the upper base substrate has a different elastic coefficient than the lower base substrate.

16. The display device of claim 15, wherein the upper base substrate has a smaller thickness than the lower base substrate.

17. The display device of claim 16, wherein a difference between bending amounts of the upper and lower base substrates due to their different elastic coefficients is substantially the same as a height difference between the conductive spacers substantially adjacent to the periphery and the conductive spacers substantially adjacent to the center.

18. The display device of claim 10, wherein the lower substrate further comprises a first sensing electrode and a second sensing electrode corresponding to each of the plurality of conductive spacers, and
the conductive spacer is configured to contact with the first and second sensing electrodes when an external pressure is applied to thereto.

19. The display device of claim 18, wherein a distance between a lower surface of the conductive spacer and the first and second sensing electrodes is about 0.3 μm to about 0.5 μm.

* * * * *